United States Patent
Zhu

(10) Patent No.: US 11,906,101 B2
(45) Date of Patent: Feb. 20, 2024

(54) PHOTOGRAPHIC EQUIPMENT ASSEMBLY AND QUICK CONNECTION ASSEMBLY THEREOF

(71) Applicant: ZHONGSHAN DASHAN PHOTOGRAPHIC EQUIPMENT CO., LTD., Zhongshan (CN)

(72) Inventor: Xihua Zhu, Zhongshan (CN)

(73) Assignee: ZHONGSHAN DASHAN PHOTOGRAPHIC EQUIPMENT CO., LTD., Zhongshan (CN)

( * ) Notice: Subject to any disclaimer, the term of this patent is extended or adjusted under 35 U.S.C. 154(b) by 345 days.

(21) Appl. No.: 17/321,486

(22) Filed: May 16, 2021

(65) Prior Publication Data

US 2021/0270406 A1  Sep. 2, 2021

Related U.S. Application Data

(63) Continuation of application No. PCT/CN2020/089683, filed on May 11, 2020.

(30) Foreign Application Priority Data

Sep. 12, 2019 (CN) .......................... 201921530338.2

(51) Int. Cl.
 *G03B 17/56* (2021.01)
 *F16M 11/04* (2006.01)
(52) U.S. Cl.
 CPC .......... *F16M 11/041* (2013.01); *G03B 17/561* (2013.01); *F16M 2200/022* (2013.01)
(58) Field of Classification Search
 CPC ............ F16M 11/041; F16M 2200/02; F16M 2200/022; F16M 2200/027; G03B 17/561; G03B 17/566
 See application file for complete search history.

(56) References Cited

FOREIGN PATENT DOCUMENTS

CN 2618031 Y * 5/2004
CN 201531720 U 7/2010

OTHER PUBLICATIONS

Gairong Kong, International Search Report issued in corresponding International application No. PCT/CN2020/089683, dated Aug. 14, 2020.
Gairong Kong, Written Opinion of the International Searching Authority for No. PCT/CN2020/089683, dated Aug. 14, 2020.

* cited by examiner

*Primary Examiner* — Clayton E. LaBalle
*Assistant Examiner* — Fang-Chi Chang

(57) ABSTRACT

The present disclosure relates to the field of photography, video recording, and provides a photographic equipment assembly and a quick connection assembly thereof. The quick connection assembly for photographic equipment includes a connecting sleeve having a first locking member and at least one second locking member; and a connecting head capable of being detachably connected with the connecting sleeve. The first locking member being configured to prevent an axial movement of the connecting head relative to the connecting sleeve, and the at least one second locking member being configured to prevent a rotation of the connecting head relative to the connecting sleeve. The first locking member can be rotated relative to the connecting sleeve to axially lock the connecting head in the connecting sleeve in an axial direction of the connecting sleeve, and release an axial locking of the connecting head in the connecting sleeve.

13 Claims, 9 Drawing Sheets

PHOTOGRAPHIC EQUIPMENT ASSEMBLY AND QUICK CONNECTION ASSEMBLY THEREOF

TECHNICAL FIELD

The present disclosure relates to the field of photography, video recording, and more particularly to a photographic equipment assembly and a quick connection assembly thereof.

BACKGROUND

A gimbal holder is usually used to connect an apparatus such as monitor, fill light, microphone, etc. to a photographic support. The gimbal holder includes a mounting base for supporting the above apparatus, a supporting arm for connecting the mounting base with the photographic support, and gimbal joints arranged between the mounting base and the supporting arm and between the supporting arm and another supporting arm. Such conventional gimbal holder is connected to the photographic support by means of a threaded connection, which thereby causing complicated and time-consuming installation and disassembly of the gimbal holder, and may miss the best opportunity to capture the crucial moment of a photo or a video.

SUMMARY

The main objective of the present disclosure is to provide a quick connection assembly for photographic equipment which overcomes the above shortcomings and a photographic equipment assembly having the quick connection assembly.

The present disclosure provides a quick connection assembly for photographic equipment, including: a connecting sleeve, including a first locking member and at least one second locking member; and a connecting head capable of being detachably connected with the connecting sleeve, wherein the first locking member is configured to prevent an axial movement of the connecting head relative to the connecting sleeve, and the at least one second locking member is configured to prevent a rotation of the connecting head relative to the connecting sleeve; and wherein the first locking member is rotatable relative to the connecting sleeve to axially lock the connecting head in the connecting sleeve in an axial direction of the connecting sleeve, and release an axial locking of the connecting head in the connecting sleeve.

In some embodiments, when the connecting head is inserted into the connecting sleeve, the first locking member rotates relative to the connecting sleeve under an action of the connecting head, and then automatically engages with the connecting head, so that the connecting head is locked in the connecting sleeve in the axial direction of the connecting sleeve.

In some embodiments, the connecting sleeve includes a connecting section and a sleeve perpendicular to the connecting section, the connecting section at least partially covers an axial end of the sleeve, and the connecting head is receivable in the sleeve.

In some embodiments, the first locking member is mounted in the sleeve and is able to partially enter into an inside of the sleeve to engage with the connecting head.

In some embodiments, the connecting head includes a main body having a substantially cylindrical shape with a annular groove arranged in a circumferential direction thereof, and a connecting plate arranged at an axial end of the main body; the first locking member partially enters into the annular groove in order to prevent the axial movement of the connecting head relative to the connecting sleeve, and the at least one second locking member cooperates with the connecting plate to prevent a rotation of the connecting head relative to the connecting sleeve.

In some embodiments, the first locking member is rotatably mounted on the sleeve of the connecting sleeve through a first connecting member.

In some embodiments, the first locking member includes a tail that can be pressed by a user, a head that is pressed against the sleeve and is integrally formed with the tail, and a locking section extending from the head toward an inside of the sleeve, the locking section can enter the annular groove of the connecting head.

In some embodiments, the tail is provided with a plurality of mounting sections extending toward the sleeve, a first elastic member is arranged between the plurality of mounting sections and presses the locking section into the sleeve.

In some embodiments, the locking section has a first locking surface perpendicular to the head and a first slope extending from the head to the first locking surface, the first locking surface is arranged between the connecting section and the first slope.

In some embodiments, the annular groove has a second locking surface capable of abutting against the first locking surface and a second slope capable of abutting against the first slope.

In some embodiments, the at least one second locking member is fixed in the connecting portion and facing the sleeve, the connecting plate is provided with at least one location hole which is engagable with the at least one second locking member.

In some embodiments, the at least one location hole includes three location holes, and the at least one second locking member includes three second locking members.

In some embodiments, a buckle is provided on the connecting sleeve, a radial size of the connecting sleeve is variable by means of the buckle to clamp the connecting head in the connecting sleeve.

The present disclosure further provides a photographic equipment assembly, including: a first photographic apparatus; and a second photographic apparatus; wherein the photographic equipment assembly further includes the above quick connection assembly, and the first photographic apparatus is connected to the second first photographic apparatus by the quick connection assembly.

The quick connection assembly provided by the present disclosure has a simple structure, can be installed and disassembled simply and quickly with a reliable locking effect, improving a connection safety.

BRIEF DESCRIPTION OF THE DRAWINGS

FIG. 4b is an exploded view of a connecting sleeve shown in FIG. 4a.

Reference signs: 200: gimbal holder; 201—supporting arm; 202: gimbal joint; 203: angle locking member; 204: first fastener; 100: quick connection assembly; 1: connecting sleeve; connecting section; 101: fixed leg; 102: pin hole; 11: sleeve; 111: first projection; 112: second projection; 113: limit slot; 114: connecting hole; 13: first locking member; 130: locking section; 131: first locking surface; 132: first slope; 133: head; 134: tail; 135: mounting section; 136: through hole; 137: first elastic member; 138: first connecting member; 14: second locking member; 2: connecting head; 21: main body; 210: flange; 211: mounting hole; 22: annular groove; 221: second locking surface; 222: second slope; 23: connecting plate; 231: main surface; 232: blocking surface; 233: location hole; 234: connecting pin; 24: connecting column; 25: second fastener; 251: inner fastener; 252: outer fastener; 253: second elastic member; 3: buckle; 31: handle; 32: eccentric section; 33: eccentric hole; 34: second connecting member; 341: connecting end; 35: third connecting member; 36: third elastic member; 37: nut; 38: block; 381: anti: deflection head; 300: photographic apparatus; 400: photographic equipment assembly.

DESCRIPTION OF THE EMBODIMENTS

The present disclosure will be further described in detail with reference to the accompanying drawings and embodiments so that the objective and the advantages of the present disclosure will be more apparent.

Figure 1:
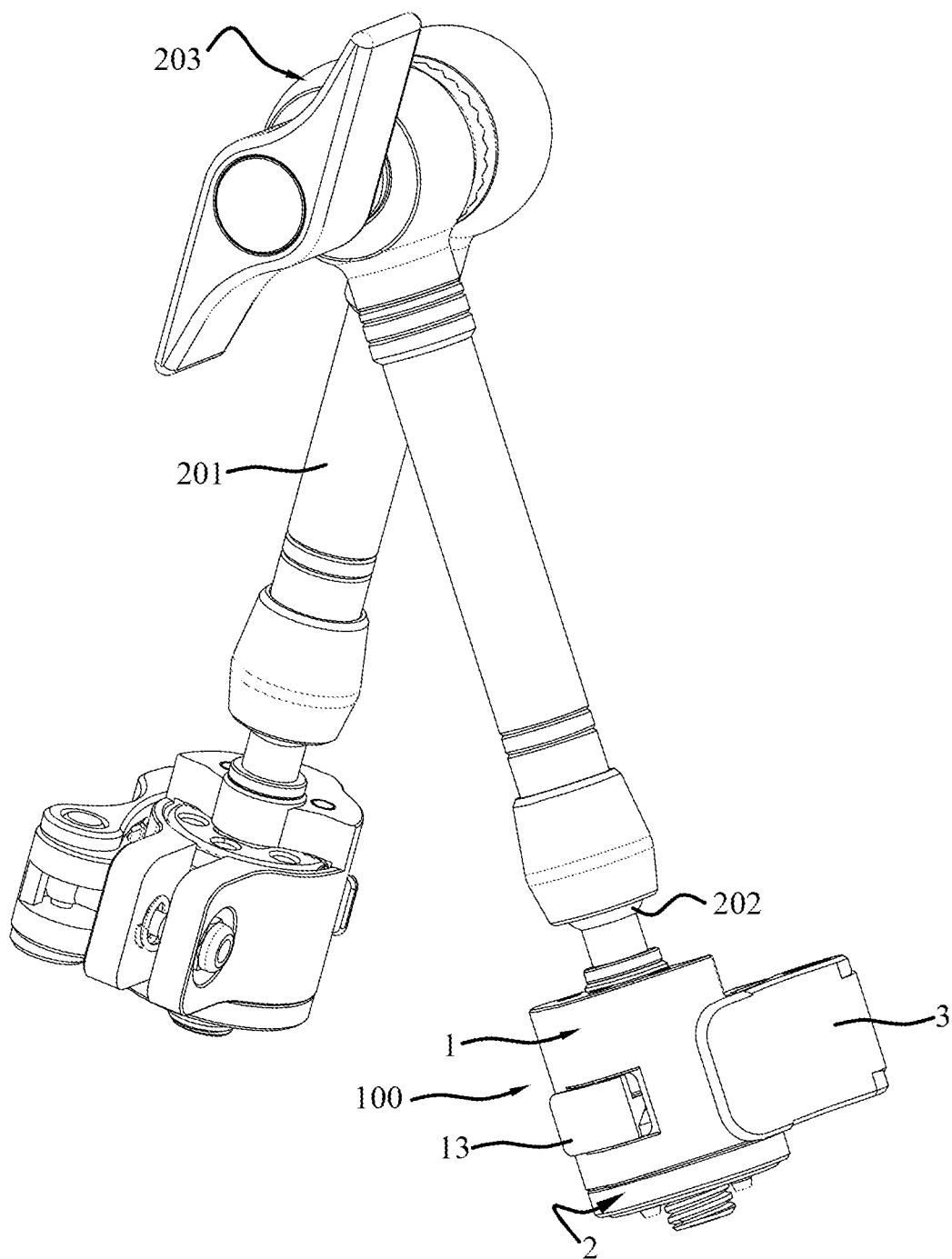
FIG. 1 is a schematic view of a photographic equipment assembly according to an embodiment of the present disclosure.

FIG. 1 shows a schematic view of a photographic equipment assembly according to an embodiment of the present disclosure. In this embodiment, a gimbal holder 200 is taken as an example to explain the photographic equipment assembly. The gimbal holder 200 includes two supporting arms 201 each of which is provided with a quick connection assembly 100 connected thereto. The supporting arms 201 are pivotally connected with each other by an angle locking member 203. Each of the supporting arms 201 is connected to the quick connection assembly 100 by a gimbal joint 202. The quick connection assembly 100 is used to connect the gimbal holder 200 with other photographic equipments. Preferably, one of the supporting arms 201 is connected to a mounting seat of a monitor, a camera and the like by the quick connection assembly 100, and the other of the supporting arms is connected with other photographic equipment (for example a tripod) by the quick connection assembly 100. In an alternative embodiment, the mounting seat is connected to the corresponding supporting arm by a gimbal joint 202, and the supporting arm is also connected with the quick connection assembly 100 by a gimbal joint 202. The specific structures of the supporting arms 201, the gimbal joint 202, the mounting seat, and the angle locking member 203 may be the same with that in the art so they will not be discussed in detail here. The two supporting arms 201 include a first supporting arm and a second supporting arm. For ease of description, the following takes the first supporting arm as an example for illustration.

Figure 2:
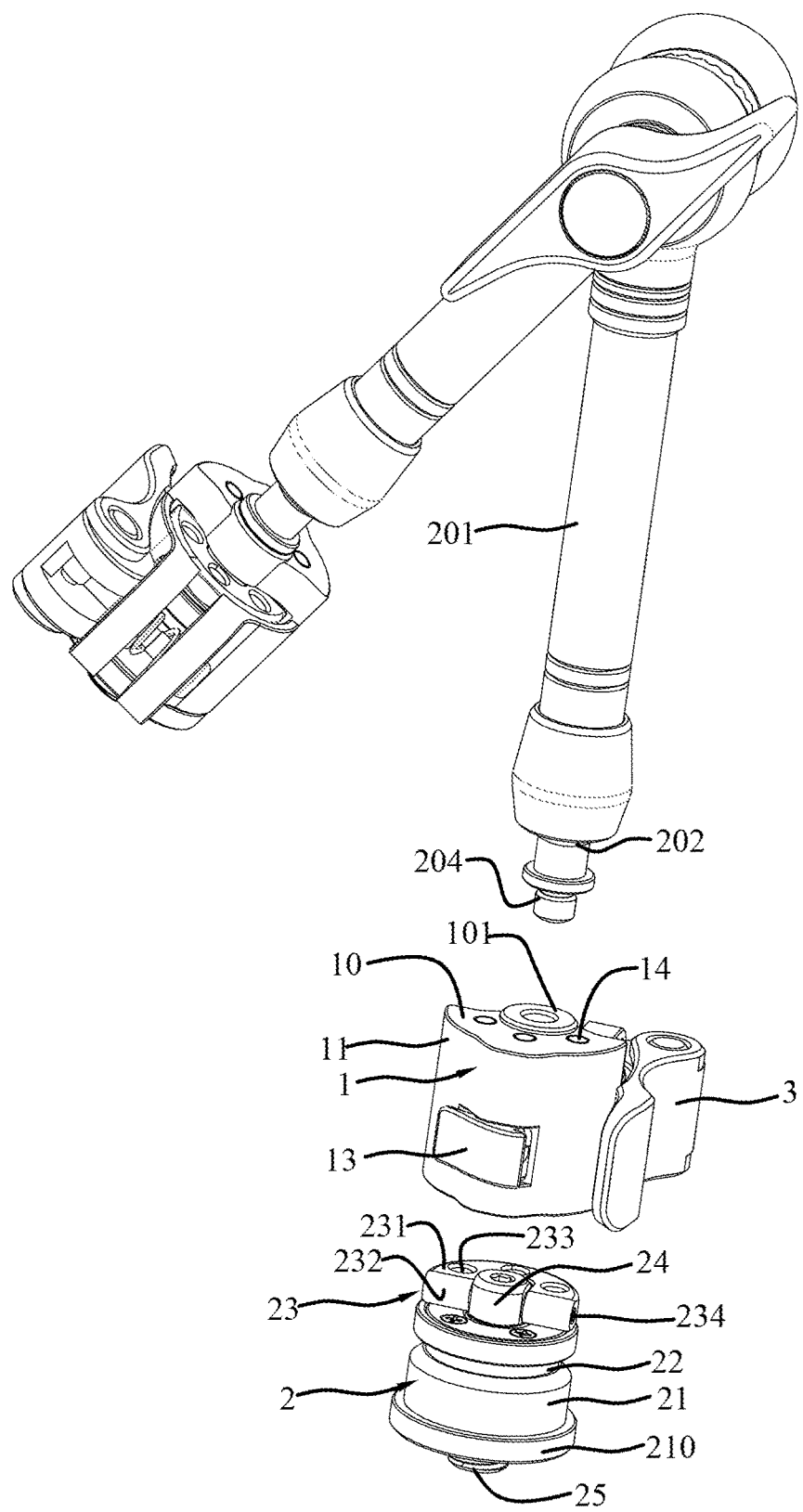
FIG. 2 is a partially exploded view of the photographic equipment assembly shown in FIG. 1.
Figure 3:
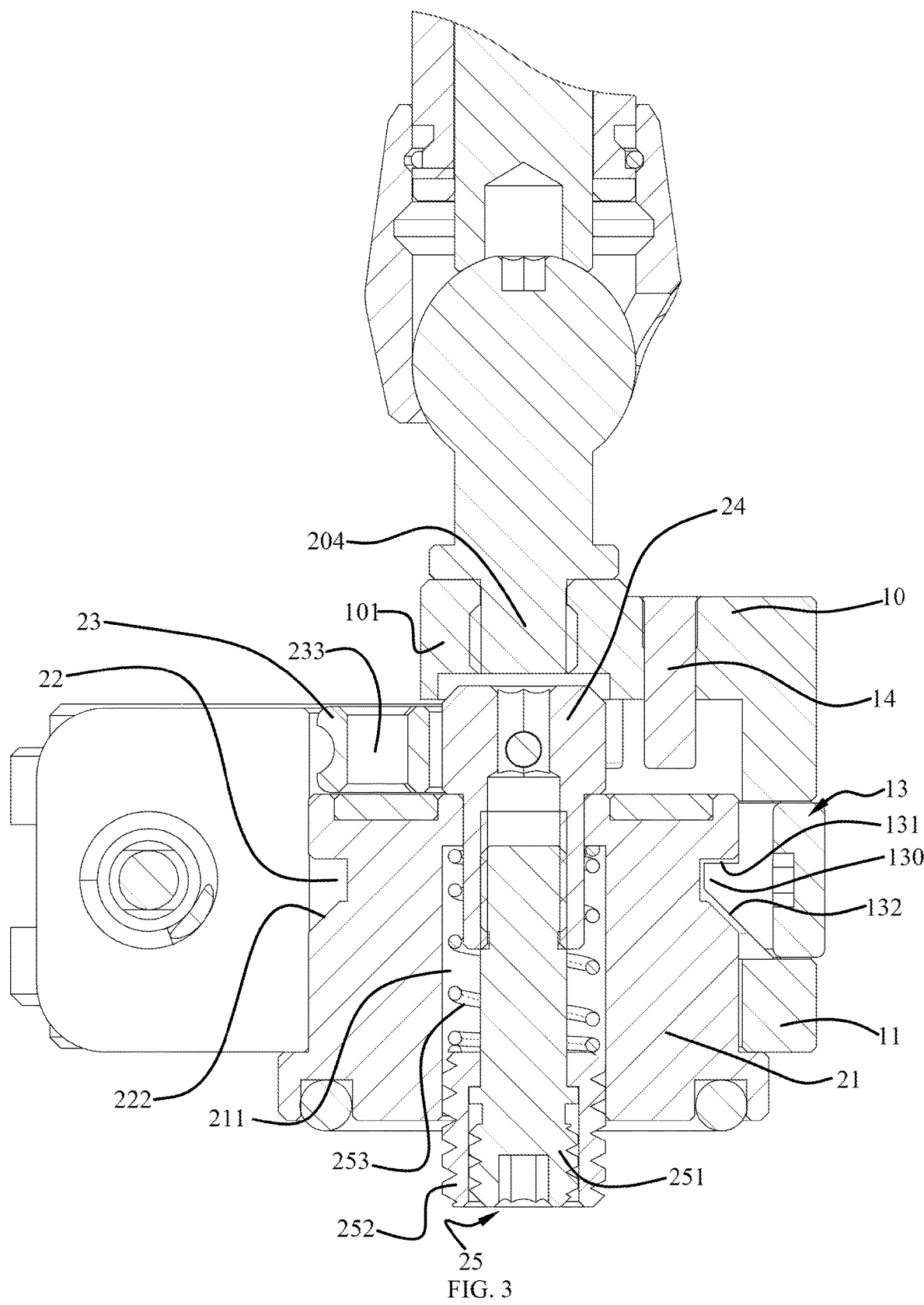
FIG. 3 is a cross sectional view of the photographic equipment assembly shown in FIG. 1 along an axial direction of an arm, in which some parts are omitted.

Referring to FIGS. 2 and 3, the quick connection assembly 100 includes a connecting sleeve 1 and a connecting head 2. The connecting head 2 can be connected to and fixed in the connecting sleeve 1. The connecting sleeve 1 includes a connecting section 10 and a sleeve 11 perpendicular to the connecting section 10. The sleeve 11 is substantially in the shape of a hollow cylinder. In this embodiment, the connecting section 10 at least partially covers an axial end of the sleeve 11. The sleeve 11 is connected to the gimbal joint 202 by the connecting section 10. In this embodiment, the connecting section 10 is connected to the gimbal joint 202 by a first fastener 204 thereof. The connecting section 10 is provided with a fixed leg 101 corresponding to the first fastener 204, wherein the first fastener 204 can be fastened in the fixed leg 101. The connecting sleeve 1 may be pre-installed on a photographic apparatus (for example a gimbal support, a tripod or the like) by the first fastener 204, and thus the connecting sleeve 1 can serve as a pre-assembled element.

The connecting sleeve 1 further includes a first locking member 13 mounted in the sleeve 11 and at least one second locking member 14 provided in the connecting section 10. The first locking member 13 is configured to prevent an axial movement of the connecting head 2 relative to the connecting sleeve 1. The at least one second locking member 14 is configured to prevent a rotation of the connecting head 2 relative to the connecting sleeve 1. The connecting head 2 is substantially cylindrical and is received in the sleeve 11. In this embodiment, the connecting head 2 includes a main body 21 having a substantially cylindrical shape with a annular groove 22 arranged in a circumferential direction of the main body 21, and a connecting plate 23 arranged at an axial end of the main body 21. After an installation of the connecting head 2 in the connecting sleeve 1, the first locking member 13 partially engages into the annular groove 22 in order to prevent the axial movement of the connecting head 2 relative to the connecting sleeve 1; and the at least one second locking member 14 cooperates with the connecting plate 23 to prevent the rotation of the connecting head 2 relative to the connecting sleeve 1.

Specifically, the first locking member 13 can be rotated relative to the sleeve 11. After the connecting head 2 is inserted into the connecting sleeve 1, the first locking member 13 can be rotated relative to the sleeve 11 and can engage into the annular groove 22 of the connecting head 2, so that the connecting head 2 can be automatically locked in the connecting sleeve 1 in the axial direction of the connecting sleeve 1. The first locking member 13 may be pressed by a user to make the first locking member 13 disengage from the annular groove 22 in order to release an axial locking of the connecting head 2 in the connecting sleeve 1.

Figure 4A:
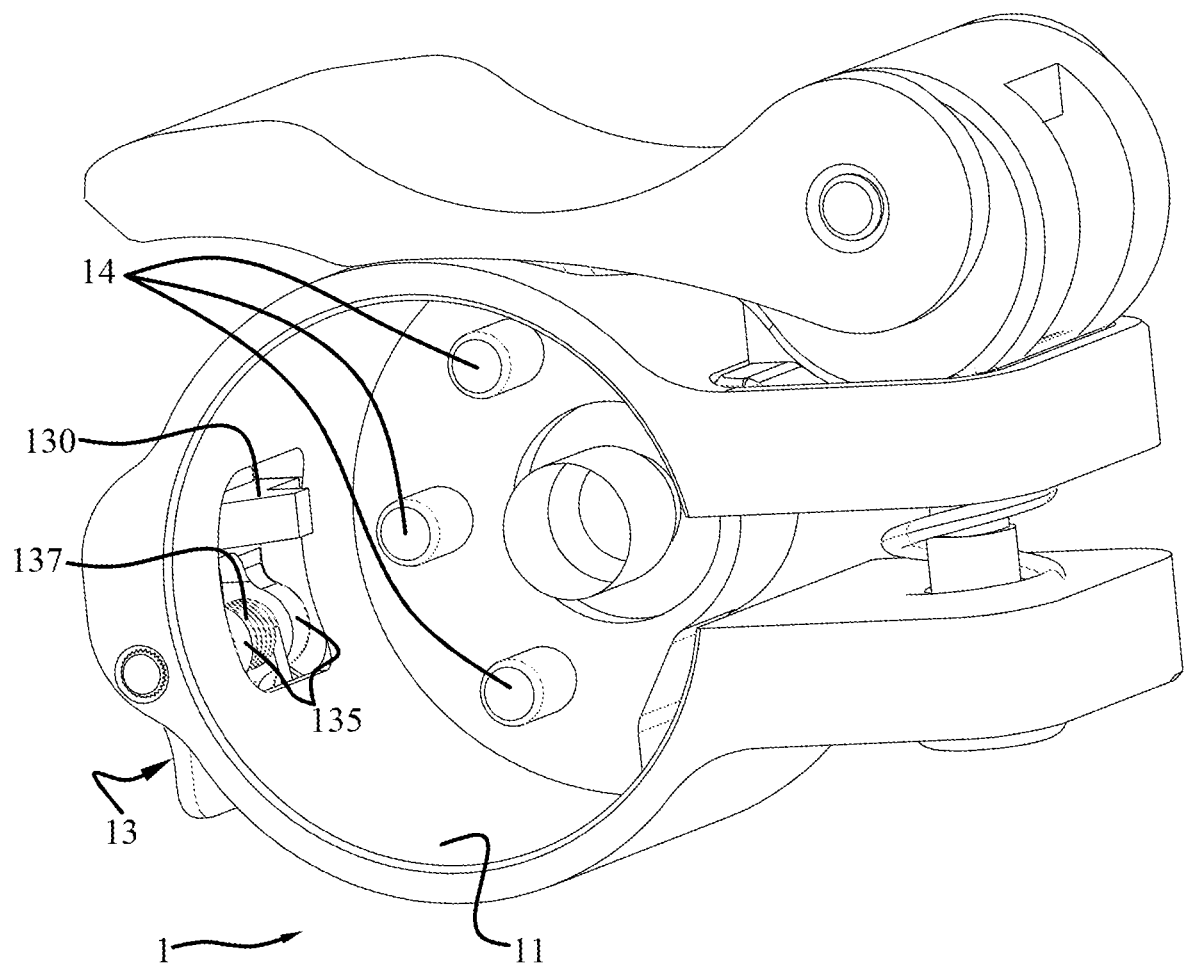
FIG. 4a is a perspective view of a connecting sleeve of a quick connection assembly of the photographic equipment assembly shown in FIG. 1.
Figure 4B:
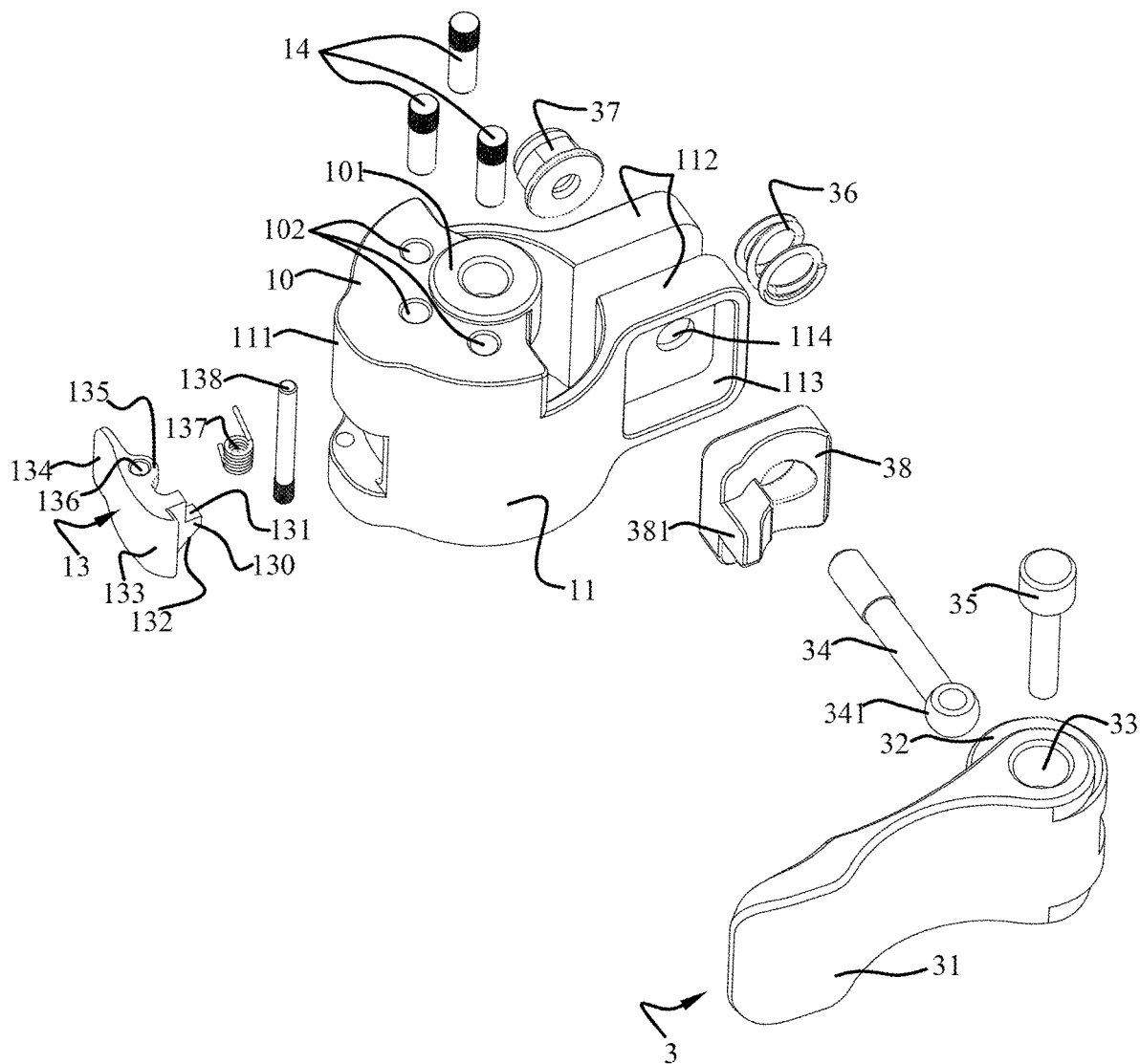

Referring to FIGS. 3 to 4b, the first locking member 13 is rotatably mounted on the sleeve 11 of the connecting sleeve 1 through a first connecting member 138. In this embodiment, the first connecting member 138 is configured as a pin. A first elastic member 137 is mounted around the first connecting member 138, and two ends of the first elastic member 137 abut against the first locking member 13 and the sleeve 11 respectively, so that the first locking member 13 is pressed against the sleeve 11. Preferably, the first elastic member 137 is a torsion spring. In this embodiment, s side of the sleeve 11 on which the first locking member 13 is installed is configured as a first projection 111 protruding outward in a radial direction thereof. The first projection 111 thickens a wall thickness of the sleeve 11 there, thereby facilitating the positioning of the first locking member 13.

The first locking member 13 is provided with a tail 134 that can be pressed by the user and a head 133 that is pressed against the sleeve 11. The user can press the tail 134 to make the first locking member 13 disengage from the annular groove 22 of the connecting head 2. The tail 134 is provided with a plurality of mounting sections 135 extending toward the sleeve 11. In this embodiment, the plurality of mounting sections 135 includes two mounting sections 135. A center of each of the plurality of mounting sections 135 is provided as a through hole 136. The first connecting member 138 can pass through the through hole 136 to connect the first locking member 13 to the sleeve 11. The first elastic member 137 is arranged between the two mounting sections 135. Under an action of the first elastic member 137, the head 133 of the first locking member 13 is pressed into the sleeve 11.

The first locking member 13 further has a locking section 130 extending from the head 133 toward an inside of the sleeve 11. In this embodiment, the locking section 130 is arranged in an inner diameter direction of the sleeve 11 in a locked state. The locking section 130 has a first locking surface 131 and a first slope 132. The first locking surface 131 is arranged between the connecting section 10 and the first slope 132. The first locking surface 131 is arranged along the inner diameter direction of the sleeve 11 and faces the connecting section 10 of the connecting sleeve 1. The first locking surface 131 is perpendicular to the head 133. In this embodiment, the first locking surface 131 and the first slope 132 are arranged oppositely in the axial direction of the sleeve 11. The first slope 132 extends from the head 133 to the first locking surface 131. The first slope 131 facilitates the connecting head 2 to be inserted into the connector sleeve 1 without pressing the tail 134 of the first locking member 13. In this embodiment, the first locking surface 131 is configured as a step surface. Optionally, the first locking surface 131 may be flush with one end surface of the head 133 which is adjacent to the first locking surface 131, and the first slope 132 is inclined from the other end surface of the head 133 which is opposite to the end surface toward the first locking surface 131.

Figure 5:
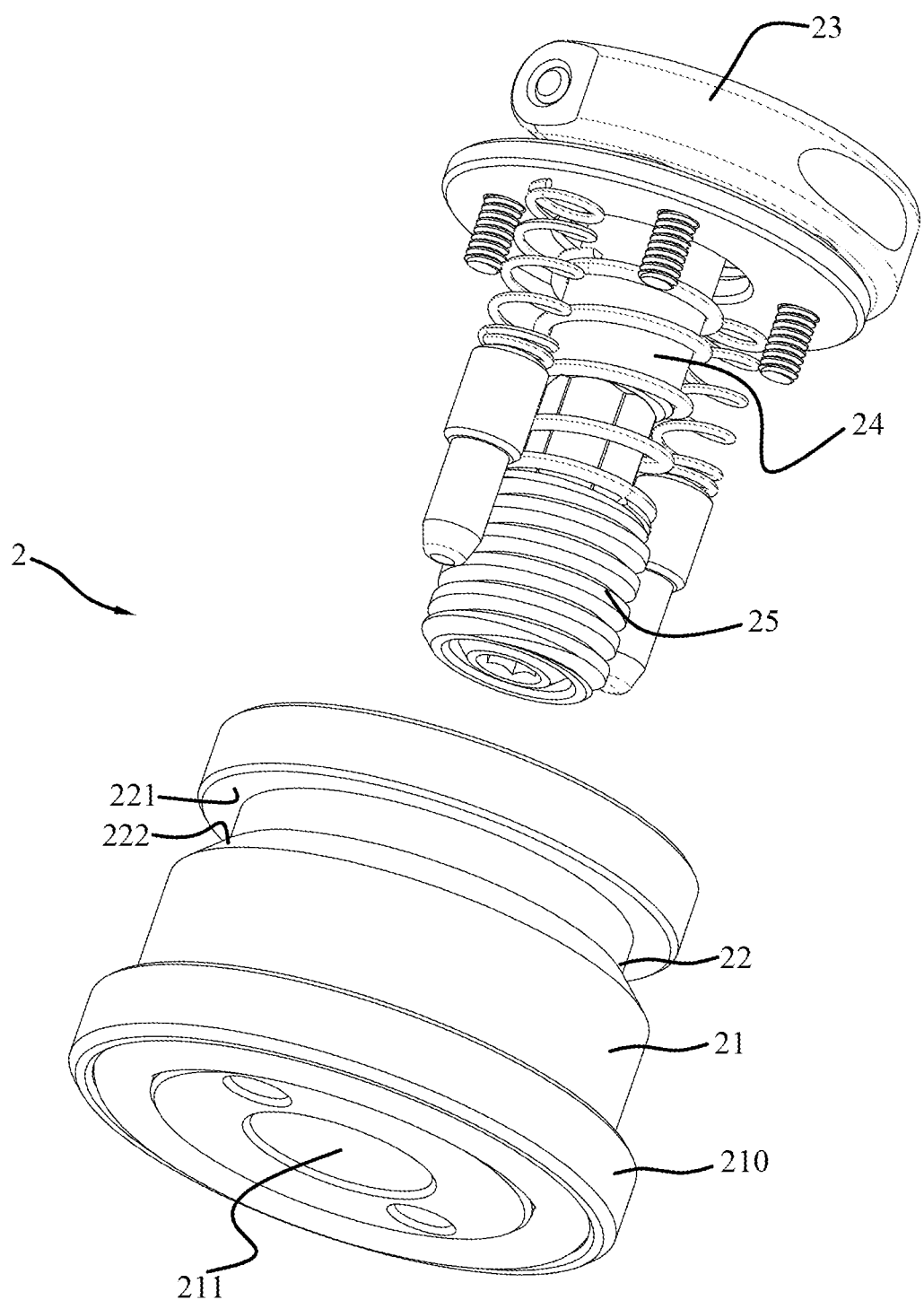
FIG. 5 is an exploded view of a connecting head of a quick connection assembly of the photographic equipment assembly shown in FIG. 1.

The locking section 130 of the first locking member 13 can enter the annular groove 22 of the connecting head 2 and engage in the annular groove 22. As shown in FIG. 5, the annular groove 22 has a second locking surface 221 and a second slope 222. Referring to FIGS. 3 and 5, in the locked state, the first locking surface 131 abuts against the second locking surface 221, and the first slope 132 abuts against the second slope 222. During the insertion of the connecting head 2 into the connecting sleeve 1, the connecting head 2 acts on the first slope 132, causing the first locking member 13 to rotate about the first connecting member 138, thereby causing the locking section 130 to exit from the inside of the sleeve 11 of the connecting sleeve 1. As the connecting head 2 is inserted into the connecting sleeve 1, when the annular groove 22 reaches a position aligned with the locking section 130, the locking section 130 automatically engages into the annular groove 22 under the action of the first elastic member 137 of the first locking member 13, so that the locking of the connecting head 2 in the axial direction of the connecting sleeve 1 is realized.

The rotation of the connecting head 2 relative to the connecting sleeve 1 is locked by at least one second locking member 14. Specifically, the at least one second locking member 14 is provided on the connecting section 10 of the connecting sleeve 1. Returning to FIGS. 2 to 4b, the at least one second locking member 14 protrudes from the connecting portion 10 toward the sleeve 11. In this embodiment, the at least one second locking member 14 is a pin, which is fixed in a pin hole 102 in the connecting section 10. Optionally, the at least one second locking member and the connecting section are integrally formed.

An axial end of the main body 21 of the connecting head 2 facing the connecting section 10 is provided with a connecting plate 23. In this embodiment, the connecting plate 23 is substantially sector-shaped, preferably semicircular-shaped, and its radius is not greater than an outer diameter of the main body 21. In the locked state, a cooperation of the at least one second locking member 14 and the connecting plate 23 prevents the connecting head 2 from rotating relative to the connecting sleeve 1. In this embodiment, the connecting plate 23 is rotatably connected to the main body 21. A center of the main body 21 is provided with a mounting hole 211. A connecting column 24 is perpendicularly arranged in the mounting hole 211, and the connecting plate 23 is rotatably connected to the connecting column 24 via a connecting pin 234. Therefore, the connecting plate 23 can be rotated around the connecting pole 24.

The connecting column 24 is connected to a second fastener 25 mounted in the main body 21. The second fastener 25 includes an inner fastener 251 fixed to the connecting column 24, an outer fastener 252 disposed outside the inner fastener 251, and a second elastic member 253 that abuts against the outer fastener 252. The outer fastener 252 can move along an axial direction of the inner fastener 251 relative to the inner fastener 251. The inner fastener 251 and the outer fastener 252 are pressed against each other by steps therebetween to realize a limitation of the inner fastener 251 in the axial direction of the main body 21. Therefore, a limitation of the connecting column 24 connected with the inner fastener 251 in the axial direction of the main body 21 is realized. In addition, the connecting head 2 further has a flange 210 arranged at an end of the main body 21 away from the connecting column 24 and extending radially outward along the main body 21. After the connecting head 2 is mounted in the connecting sleeve 1, the flange 210 covers an end of the sleeve 11 to achieve an aesthetic effect.

The connecting plate 23 can rotate about the axial direction of the main body 21, so that the connecting column 24 is driven to rotate relative to the main body 21. Therefore, the inner fastener 251 fixed to the connecting column 24 can also be rotated relative to the main body 21. When the connecting plate 23 is rotated around the axial direction of the main body 21, the inner fastener 251 can be rotatably mounted on a corresponding photographic apparatus (for example, a photographic stand, a camera, and a video camera, etc.), so that the photographic apparatus can be connected to the connecting head 2 conveniently and effortlessly.

Therefore, the connecting plate 23 can rotate about the axial direction of the main body 21 and can also rotate about radial direction of the main body 21. After the connecting head 2 is connected to the photographic apparatus, for example, a photographic stand, a camera, a video camera, etc., the rotation of the connecting head 2 around the axial direction of the main body 21 is prevented.

After the connecting head 2 connected with the photographic apparatus is inserted into the connecting sleeve 1, the rotation of the connecting head 2 relative to the connecting sleeve 1 is limited by a cooperation of the at least one second locking member 14 and the connecting plate 23. In the locked state, the connecting plate 23 is rested on the main body 21. At then, the connecting plate 23 has a blocking surface 232 substantially parallel to the axial direction of the main body 21 and two main surfaces 231 parallel to the radial direction of the main body 21. In this embodiment, the connecting plate 23 is provided with at least one location hole 233 communicating the two main surfaces 231. The at least one second locking member 14 can be engaged in the at least one location hole 233 to lock the rotation of the connecting head 2 relative to the connecting sleeve 1. Preferably, the at least one second locking member 14 is a pin, which can be inserted into the at least one location hole 233.

Figure 6A:
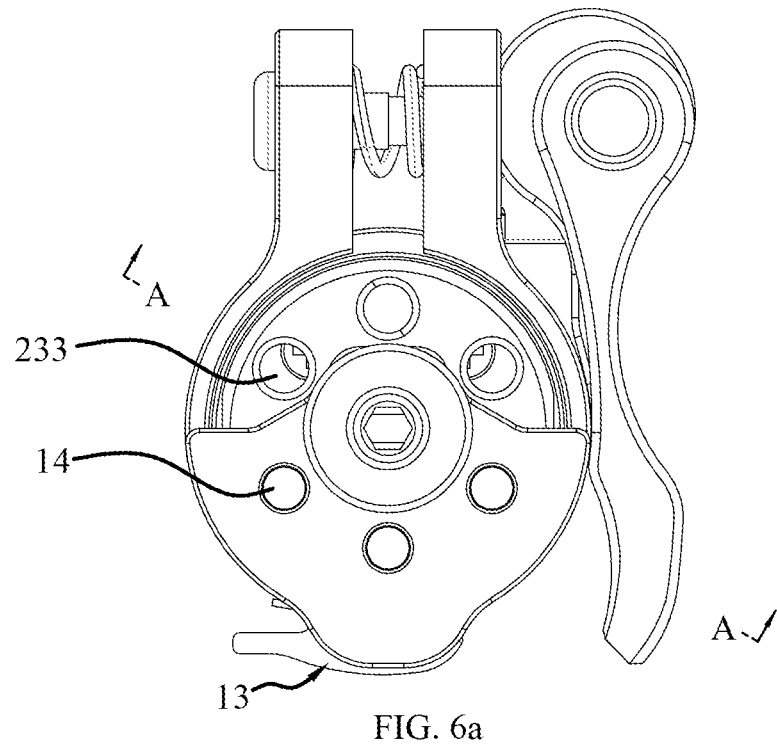
FIG. 6a is a top view of a quick connection assembly of the photographic equipment assembly shown in FIG. 1.
Figure 6B:
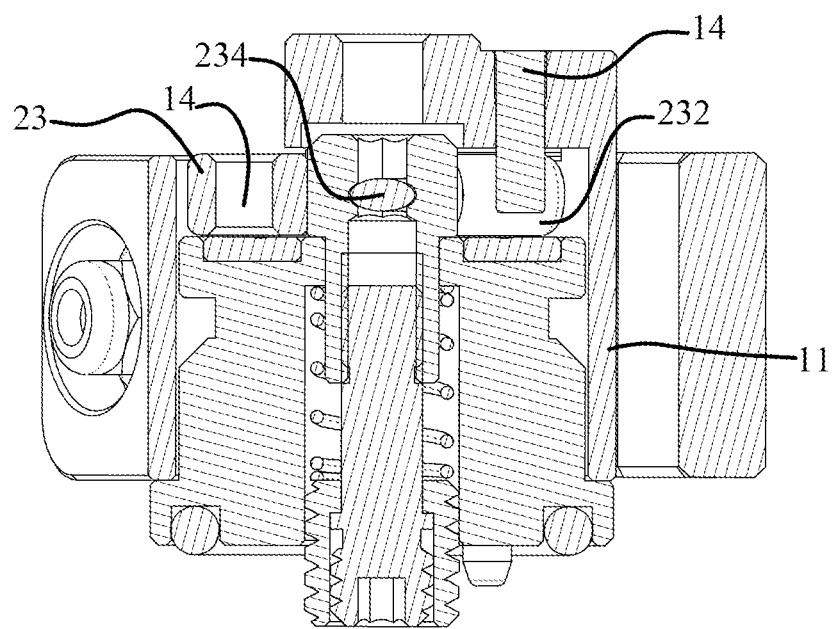
FIG. 6b is a cross sectional view of the quick connection assembly shown in FIG. 6a along A-A direction.

In this embodiment, the at least one location hole 233 includes three location holes 233. The at least one second locking member 14 includes three second locking members 14. Referring to FIGS. 6a and 6b, in the top view of the quick connection assembly 100, the three location holes 233 and the three second locking members 14 are arranged at equal intervals on a circle concentric with an outer circumference of the connecting head 2. In the locked state of the quick connection assembly 100, the blocking surface 232 of the connecting plate 23 abuts against the two second locking members 14, so as to lock the rotation of the connecting head 2 relative to the connecting sleeve 1. In this embodiment, the configuration of the three location holes 233 and the three second locking members 14 facilitates the user to insert the connecting head 2 into the connecting sleeve 1 without aligning the three location holes 233 with the three second locking members 14 with each other. Specifically, the rotation of the connecting head 2 relative to the connecting sleeve 1 can be locked by the following manners: the three second locking members 14 are respectively inserted into the three location holes 233 to lock the above-mentioned rotation; two adjacent second locking members 14 are respectively inserted into two adjacent positioning holes 233 to lock the above-mentioned rotation; one second locking member 14 is inserted into one positioning hole 233 to lock the above-mentioned rotation; and the blocking surface 232 abuts against two second locking member 14 to lock the above-mentioned rotation. Optionally, the connecting plate 23 and the main body 21 of the connecting head 2 may be integrally formed. The arrangement of the location holes in the connecting plate 23 can be the same as in the above-mentioned embodiment, and will not be described in detail here.

Figure 7A:
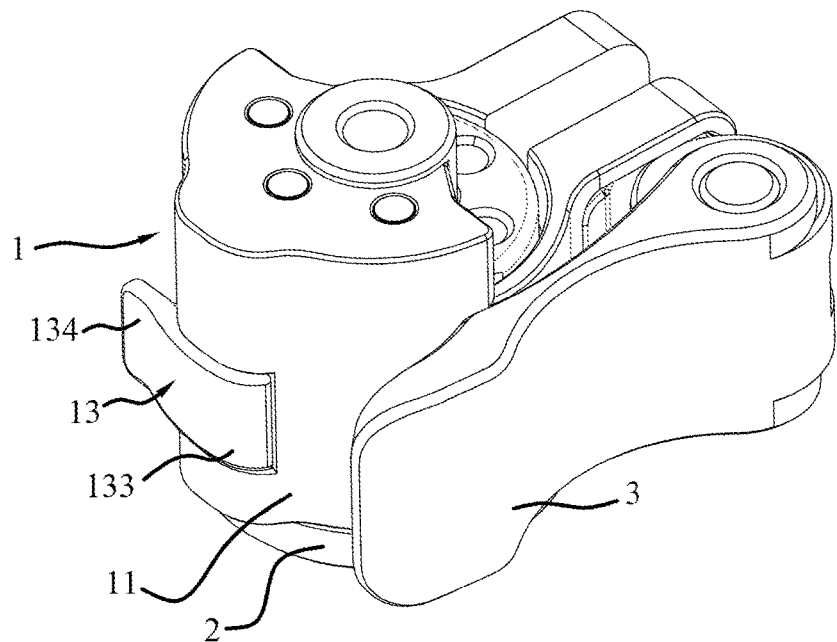
FIG. 7a is a perspective view of a quick connection assembly of the photographic equipment assembly shown in FIG. 1, with the quick connection assembly being in a locked state.
Figure 7B:
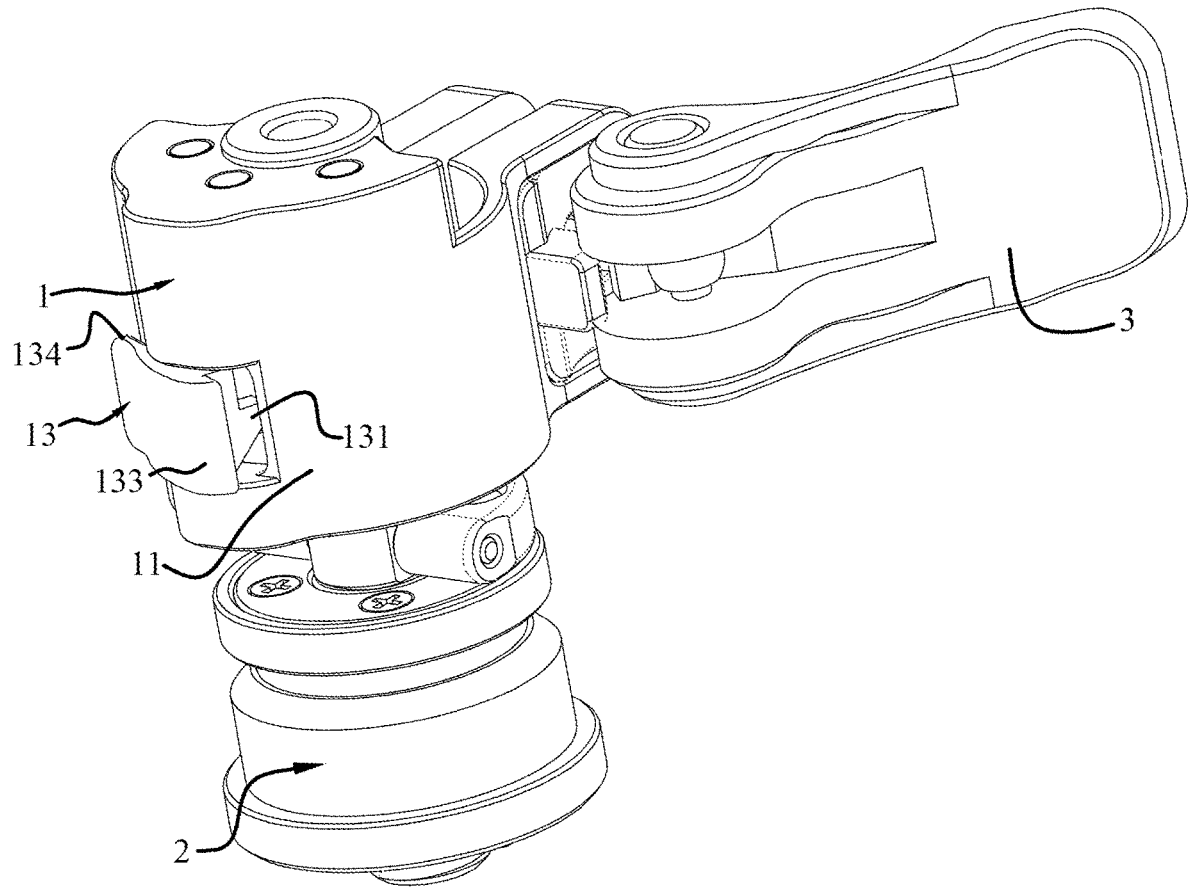
FIG. 7b is a perspective view of a quick connection assembly shown in FIG. 7a, with the quick connection assembly being in a released state.

Referring to FIGS. 7a and 7b, perspective views of the quick connection assembly 100 in its locked state and released state are respectively shown. The quick connection assembly 100 includes a buckle 3 arranged on the connecting sleeve 1. The buckle 3 can pivot relative to the connecting sleeve 1. A radial size of the connecting sleeve 1 can be changed by the buckle 3, and thus the connecting head 2 is clamped in the connecting sleeve 1. In practice, when a photographic apparatus (such as a camera, a surveillance camera) connected to other photographic apparatus (such as a gimbal holder 200) by using the buckle 3 is facing downwards, then a turning of the buckle 3 to release the connecting 2 (connected with the other photographic apparatus) will cause the other photographic apparatus to suddenly fall under the action of its gravity and be damaged if only the buckle 3 is used to realize the locked state and the released state of the quick connection assembly. Therefore, the above-mentioned first locking member 13 of the quick connection assembly 100 is provided on the connecting sleeve 1 in the present disclosure, so that when the buckle 3 is opened, the connecting head 2 is still retained in the connecting sleeve 1 via the first locking member 13. In addition, since the other photographic apparatus has a larger weight and a larger size in an axial direction transverse to the quick connection assembly, the rotation of the connecting head 2 relative to the connecting sleeve 1 cannot be completely prevented by just the locking of the buckle 3 in use. Therefore, the at least one second locking member 14 is provided on the connecting head 2 of the quick connection assembly 100 in the present disclosure, to further prevent the connecting head 2 from rotating relative to the connecting sleeve 1.

In the locked state, the head 133 of the first locking member 13 is pressed into the sleeve 11 to lock the connecting head 2 in the connecting sleeve 1. In order to release the connecting head 2 from the connecting sleeve 1, the buckle 3 is first opened, and then the tail 134 of the first locking member 13 is pressed to remove the head 133 from the connecting 2 to unlock the connecting head 2. In order to lock the connecting head 2 in the connecting sleeve 1, the connecting head 2 is inserted into the connecting sleeve 1, the first locking member 13 thus rotates relative to the connecting sleeve 1 under the action of the connecting head 2, and then automatically engages with the annular groove 22 of the connecting head 2, at the same time, the at least the second locking member 14 prevents the connecting head 2 from rotating relative to the connecting sleeve 1, and then the buckle 3 is closed, so that the connecting head 2 is locked in the connecting sleeve 1. In addition, the buckle 3 can also compensate for a gap caused by assembly tolerances, and achieve a stable connection between the connecting head 2 and the connecting sleeve 1.

The buckle 3 is mounted on the sleeve 11 of the connecting sleeve 1. Also referring to FIG. 4b, the sleeve 11 of the connecting sleeve 1 is partially opened in its circumferential direction. The sleeve 11 has two second projections 112 extending outward from two ends of the opening of the sleeve 11. The two second projections 112 extend outward in parallel. Each of the second projections 112 is provided with a connecting hole 114 extending perpendicular to its extending direction. The second connecting member 34 passes through the two connecting holes 114 to connect the buckle 3 to the sleeve 11. In this embodiment, one end of the second connecting member 34 is fixed in the connecting hole 114 in one of the second projections 112 by a nut 37, and the other end of the second connecting member 34 passes through the connecting hole 114 of the other of the second projections 112 to be connected to the buckle 3. When the buckle 3 pivots with respect to the sleeve 11, the second connecting member 34 works cooperatively with the buckle 3, so that a distance between the two second projections 112 is reduced, so that an inner diameter of the partially opened sleeve 11 of the connecting sleeve 1 is reduced, and thus connecting head 2 engaged in the connecting sleeve 1 is clamped in the connecting sleeve 1.

In this embodiment, one end of the second connecting member 34 can be connected to the nut 37 by a thread, and the other end is arranged as a connecting end 341 with a central opening. In other embodiments, the one end of the second connecting member 34 may be connected and fixed in the corresponding connecting hole 114 of one of the second projections 112 in any suitable manner.

The buckle 3 includes a handle 31 which can be manipulated by the user, and an eccentric section 32 provided at a lateral end of the handle 31. The thickness of the eccentric section 32 in a direction perpendicular to the lateral end is greater than the thickness of the handle 31 in this direction. In this embodiment, the eccentric section 32 is arc-shaped. The eccentric section 32 is provided with an eccentric hole 33 eccentrically arranged in its vertical direction. A pivoting of the buckle 3 relative to the connecting sleeve 1 causes the connecting sleeve 1 to retain a clamped state or a released state. When the buckle 3 pivots relative to the connecting sleeve 1 to clamp the connecting head 2, the eccentric hole 33 of the buckle 3 is eccentrically arranged farther from one of the second projections 112 of the connecting sleeve 1. A third connecting member 35 is arranged in the eccentric hole 33, and the third connecting member 35 is connected to the second connecting member 34 to pivotally connect the buckle 3 to the connecting sleeve 1. Preferably, the third connecting member 35 passes through the connecting end 341 of the second connecting member 34. In this embodiment, the third connecting member 35 is a pivot shaft. Therefore, when the buckle 3 is rotated from its release position to its clamping position, a distance between the eccentric hole 33 and the second projection 112 of the sleeve 11 adjacent to the eccentric hole 33 increases due to the arrangement of the eccentric hole 33, and the buckle 3 cooperates with the second connecting member 34 so that the distance between the two second projections 112 is reduced, and the inner diameter of the sleeve 11 of the connecting sleeve 1 is reduced, and thus the connecting head 2 is clamped in the connecting sleeve 1.

In this embodiment, a third elastic member 36 mounted around the second connecting member 34 is further provided between the two second projections 112. Two ends of the third elastic member 36 press against the corresponding second projections 112 respectively, so that the buckle 3 can be stably located in its locked position.

A limit slot 113 is provided at a corresponding position of the second projection 112 adjacent to the eccentric section 32. A block 38 is arranged in the limit slot 113, and the second connecting member 34 passes through the block 38 and then is connected to the buckle 3. One side of the block 38 is provided with an anti-deflection head 381 that can be engaged with the eccentric section 32, so that the buckle 3 is avoided from shaking when it is in the clamping position, and the reliable positioning of the buckle 3 can be achieved. In this embodiment, the block 38 can further protect the eccentric section 32 and prevent an abrasion of the eccentric section 32.

Figure 8:
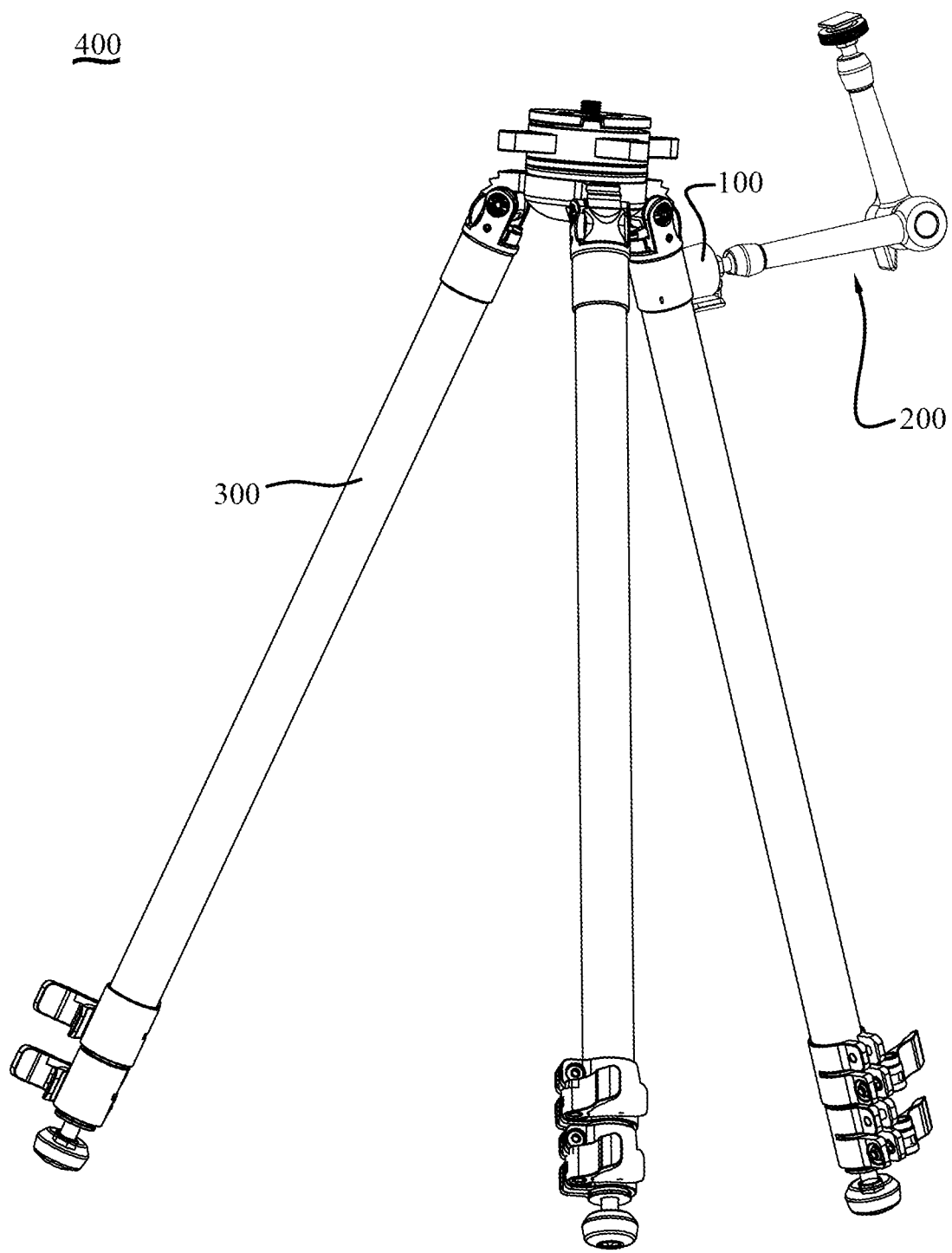
FIG. 8 shows a photographic equipment assembly according to another embodiment of the present disclosure.

As shown in FIG. 8, the gimbal holder 200 provided with the above-mentioned quick connection assembly 100 according to the present disclosure can be connected to an existing photographic apparatus 300 (for example, a photographic stand) through the quick connection assembly 100 to form a photographic equipment assembly 400 having the gimbal holder 200 and the quick connection assembly 100. In addition, the gimbal holder 200 is also suitable for being mounted to a camera, a video camera, or the like. It can be understood that the quick connection assembly 100 provided by the present disclosure can be adapted to connecting a photographic apparatus (such as a camera, a monitor, a fill light, a microphone, etc.) with other photographic apparatus (such as a tripod), rather than being limited to the connection combination related to the gimbal holder.

The quick connection assembly 100 provided by the present disclosure has a simple structure, can be installed and disassembled simply and quickly with a reliable locking effect, improving the safety of the connection.

The above is only preferred embodiments of the present disclosure, and is not intended to limit the present disclosure. Any modifications, equivalent substitutions and improvements made within the spirit and principles of the present disclosure should be included in the scope of protection of the present disclosure.

What is claimed is:

1. A quick connection assembly for photographic equipment, comprising:
    a connecting sleeve, comprising a first locking member and at least one second locking member; and
    a connecting head capable of being detachably connected with the connecting sleeve, wherein
    the first locking member is configured to prevent an axial movement of the connecting head relative to the connecting sleeve, and the at least one second locking member is configured to prevent a rotation of the connecting head relative to the connecting sleeve; and
    wherein the first locking member is rotatable relative to the connecting sleeve to axially lock the connecting head in the connecting sleeve in an axial direction of the connecting sleeve, and release an axial locking of the connecting head in the connecting sleeve, wherein when the connecting head is inserted into the connecting sleeve, the first locking member rotates relative to the connecting sleeve under an action of the connecting head, and then automatically engages with the connecting head, so that the connecting head is locked in the connecting sleeve in the axial direction of the connecting sleeve.

2. The quick connection assembly according to claim 1, wherein the connecting sleeve comprises a connecting section and a sleeve perpendicular to the connecting section, the connecting section at least partially covers an axial end of the sleeve, and the connecting head is receivable in the sleeve.

3. The quick connection assembly according to claim 2, wherein the first locking member is mounted in the sleeve and is able to partially enter into an inside of the sleeve to engage with the connecting head.

4. The quick connection assembly according to claim 3, wherein the connecting head comprises a main body having a substantially cylindrical shape with a annular groove arranged in a circumferential direction thereof, and a connecting plate arranged at an axial end of the main body; the first locking member partially enters into the annular groove in order to prevent the axial movement of the connecting head relative to the connecting sleeve, and the at least one second locking member cooperates with the connecting plate to prevent a rotation of the connecting head relative to the connecting sleeve.

5. The quick connection assembly according to claim 4, wherein the first locking member is rotatably mounted on the sleeve of the connecting sleeve through a first connecting member.

6. The quick connection assembly according to claim 4, wherein the first locking member comprises a tail that can be pressed by a user, a head that is pressed against the sleeve and is integrally formed with the tail, and a locking section extending from the head toward an inside of the sleeve, the locking section can enter the annular groove of the connecting head.

7. The quick connection assembly according to claim 6, wherein the tail is provided with a plurality of mounting sections extending toward the sleeve, a first elastic member is arranged between the plurality of mounting sections and presses the locking section into the sleeve.

8. The quick connection assembly according to claim 6, wherein the locking section has a first locking surface perpendicular to the head and a first slope extending from the head to the first locking surface, the first locking surface is arranged between the connecting section and the first slope.

9. The quick connection assembly according to claim 8, wherein the annular groove has a second locking surface capable of abutting against the first locking surface and a second slope capable of abutting against the first slope.

10. The quick connection assembly according to claim 4, wherein the at least one second locking member is fixed in the connecting portion and facing the sleeve, the connecting plate is provided with at least one location hole which is engagable with the at least one second locking member.

11. The quick connection assembly according to claim 10, wherein the at least one location hole comprises three location holes, and the at least one second locking member comprises three second locking members.

12. The quick connection assembly according to claim 1, wherein a buckle is provided on the connecting sleeve, a radial size of the connecting sleeve is variable by means of the buckle to clamp the connecting head in the connecting sleeve.

13. A photographic equipment assembly, comprising:
a first photographic apparatus; and
a second photographic apparatus;
wherein the photographic equipment assembly further comprises the quick connection assembly according to claim 1, and the first photographic apparatus is connected to the second first photographic apparatus by the quick connection assembly.

\* \* \* \* \*